United States Patent
Brennan

(10) Patent No.: US 10,520,189 B2
(45) Date of Patent: Dec. 31, 2019

(54) MULTIPLE PIECE FIREBOX FOR KAMADO GRILL

(71) Applicant: Premier Specialty Brands LLC, Duluth, GA (US)

(72) Inventor: Robert A. Brennan, Duluth, GA (US)

(73) Assignee: Premier Specialty Brands LLC, Duluth, GA (US)

( * ) Notice: Subject to any disclaimer, the term of this patent is extended or adjusted under 35 U.S.C. 154(b) by 376 days.

(21) Appl. No.: 15/389,416

(22) Filed: Dec. 22, 2016

(65) Prior Publication Data
US 2018/0180286 A1   Jun. 28, 2018

(51) Int. Cl.
*F23L 1/02* (2006.01)
*A47J 37/07* (2006.01)

(52) U.S. Cl.
CPC ............. *F23L 1/02* (2013.01); *A47J 37/0704* (2013.01); *A47J 37/0759* (2013.01); *A47J 37/0763* (2013.01)

(58) Field of Classification Search
CPC . A47J 37/0763; A47J 37/0704; A47J 37/0759
See application file for complete search history.

(56) References Cited

U.S. PATENT DOCUMENTS

| | | | |
|---|---|---|---|
| 3,269,070 A * | 8/1966 | Stoy | F23M 5/06 52/249 |
| 4,938,202 A | 7/1990 | Hait | |
| 5,024,208 A * | 6/1991 | Hottenroth | A47J 37/0763 126/25 R |
| 5,359,988 A | 11/1994 | Hait | |
| 9,422,865 B2 * | 8/2016 | Graves | F02C 7/20 |
| 10,070,754 B2 * | 9/2018 | Schlosser | A47J 37/0704 |
| 2010/0095946 A1 | 4/2010 | Creel | |
| 2016/0174766 A1 | 6/2016 | Schlosser | |

FOREIGN PATENT DOCUMENTS

| | | |
|---|---|---|
| DE | 102013010377 A1 | 6/2014 |
| DE | 102014220789 A1 | 8/2016 |
| EP | 2267351 | 12/2010 |

OTHER PUBLICATIONS

Office Action from German Patent and Trademark Office, dated Aug. 1, 2018.
International Search Report and Written Opinion, dated May 16, 2018.
Kamado Joe Replacement AMP Firebox for 18" Ceramic Grill (Jul. 7, 2016) (PDF included in ISR document attached herewith).

* cited by examiner

*Primary Examiner* — David J Laux
(74) *Attorney, Agent, or Firm* — Miller & Martin PLLC

(57) ABSTRACT

A multiple piece firebox for placement within the kettle of a fuel-burning cooking vessel comprising a base formed of a refractory material on the floor of the kettle supporting an upper chamber formed of a refractory material. In a preferred embodiment, a plurality of mating side wall members define the upper chamber.

24 Claims, 5 Drawing Sheets

MULTIPLE PIECE FIREBOX FOR KAMADO GRILL

FIELD OF THE INVENTION

This invention relates to a new and improved firebox for use in fuel burning cookers and grills, and in particular, for use in kamado-style grills, and particularly to a new and improved firebox for use in a kamado-style grill.

BACKGROUND OF THE INVENTION

A kamado is the Japanese term for a traditional cooking stove fueled by wood or charcoal. In its more modern sense, the term kamado has come to denote a wood-fired or charcoal-fired cooking vessel typically made from ceramic, clay, terracotta or crushed lava rock to create a grill that can withstand temperatures in excess of 750° F. without cracking from extreme heat or temperature fluctuations. Of course, modern kamado-style grills may be formed from any suitable refractory materials, included those listed above as well as various metals or metal alloys. Kamado-style grills/smokers are typically thought of as having a circular or oval cross-section in the horizontal plane, though square, rectangular or other shaped kamado-style cookers are certainly within the contemplation of the present invention.

A kamado typically comprises an egg-shaped body with a hinged, domed top, the body being made of relatively thick ceramic or other refractory material. Kamado style grills usually have a hinged top because the ceramic top is very heavy and would be difficult to handle if it were not attached. Both the base and the top have one or more adjustable vents, chimneys or air control dampers to provide the user with a means for controlling the flow of air through the cooking chamber.

Most kamado grills have a high gloss ceramic glaze or are enameled to retain a glossy exterior finish over time despite exposure to the elements. The body, both the lower kettle or grill base and the domed top or grill dome comprise relatively thick ceramic or clay walls to provide a rigid structure as well as retain the heat within the body. Ceramics are a preferred refractory material because they retain the heat within the cooking chamber and do not conduct heat very well, so, while not a perfect insulator, the ceramic walls do provide a significant measure of insulation in that they do not readily allow the passage of heat.

The construction materials and good air control gives these grills excellent insulation, high heating efficiency, and the ability to hold very high temperatures without significant heat loss, making them especially suited for a wide range of grilling, roasting, baking and smoking.

The cooking chamber of a kamado grill, i.e., the enclosed portion containing the heating fuel and the cooking surface, is generally ovoid in shape with a circular or oval horizontal cross-section. The cooking chamber is usually heated by a combustible fuel, such as charcoal or wood, placed in the bottom of the cooking chamber formed within the grill base. In order to hold the fuel and to better shape the fire, a firebox is disposed within the base. The firebox helps to protect the grill base by separating the burning fuel from the walls of the grill base, thereby reducing the wear of expansion and contraction of the walls which can, over time, lead to cracking of the refractory materials.

The firebox typically supports a grilling surface. In some embodiments, the firebox supports a separate fire ring which, in turn, supports the grilling surface. In other embodiments, the firebox may also support a rack or rack holder to support the grilling surface.

The firebox typically also supports a lower grate above the floor of the grill base. The lower grate divides the firebox into an upper chamber and a lower chamber. The lower grate serves to support the fuel, allow air to flow from below the burning fuel, and allow ash to fall through the grate to the floor or bottom of the grill base.

Because the firebox contains the fuel and ashen remains of the spent fuel, fireboxes typically have an opening at the bottom through which ashes may be removed. The firebox is preferably positioned such that the firebox ash openings are aligned with a corresponding ash removal opening in the grill base to provide a direct path for ash to be removed from the firebox and grill base. Firebox ash openings are typically covered, such as with a door or vent that may be opened or closed as necessary. Of course, any vents provided are preferably themselves adjustable so that air flow through the cooking chamber may be more precisely regulated.

Fireboxes and fire rings are also manufactured from refractory material, typically clay or ceramics and as such, can be very heavy, thick and massive. A typical ceramic firebox weighs between about 20 kg to about 40 kg, depending on the size of the grill. The thickness of the firebox side wall and base may range between about 30 mm to about 40 mm. For example, Applicant in planning to introduce the inventive firebox of the present invention in two different sizes of kamado grills. The assembled firebox of the smaller kamado grill will weigh about 24 kg and the thickness of the base and side wall members will be between about 33 mm to about 35 mm. The assembled firebox of the larger kamado grill will weigh about 36 kg, and the thickness of the base and side wall members will be between about 35 mm to about 36 mm.

As used in this disclosure, "refractory materials," also referred to simply as "refractories," are heat-resistant materials that retains their strength at high temperatures. Refractories provide containment of substances at high temperatures. ASTM C71 defines refractories as "non-metallic materials having those chemical and physical properties that make them applicable for structures, or as components of systems, that are exposed to environments above 1,000° F. (811 K; 538° C.)."

Refractories, such as clay and, more preferably, ceramic materials, are especially suited to use as the material from which a firebox is made due to their relatively low thermal coefficient of expansion. Thermal expansion is the tendency of a material to change in size, shape, area or volume in response to a change in temperature. The coefficient of thermal expansion describes how the size of an object changes with a change in temperature. Having a lower or smaller thermal coefficient of thermal expansion means a material will expand (or contract) less as the temperature rises (or falls). Ceramics do not conduct heat very well, and have a low thermal coefficient of expansion. Comparatively, copper conducts heat very quickly, as do most metals, which also have higher thermal coefficients of expansion than do ceramics. Accordingly, ceramics can absorb a great quantity of heat without cracking. But for any given piece of material, if heat is applied non-uniformly, such as around a pile of burning wood, coal, charcoal or other fuel, the piece becomes more susceptible to cracking due to different areas of the piece expanding and contracting at different rates. In other words, if a refractory material experiences a homogeneous temperature throughout, it will expand and contract homogeneously. But when heat is applied across a single piece of refractory material in a non-homogeneous manner, different parts or areas of the material will experience different temperatures and experience temperature changes at different rates. Thus a refractory material that experiences temperature changes non-homogeneously will be more susceptable to cracking as compared to a piece that experiences substantially homogeneous temperatures throughout.

Despite being manufactured out of refractories, the fireboxes of kamado-style grills experience the highest rate of failure of any component of a grill. Because its purpose is to shape the fire and protect the walls of the grill base, the firebox bears the brunt of the exposure to extreme heat and rapid temperature change. Refractories, such as ceramic materials do not expand much when exposed to higher temperatures, but they do still expand, even if it is less than another material might. The constant, relatively rapid expansion and contraction coupled with non-uniformity of temperatures within the firebox, lead to expansion and contraction at different areas of the firebox at different rates. For example, because the fuel is held within the upper chamber of the firebox above the lower grate, and only ash from spent fuel or small burning bits of fuel or meat fall below the grate into the lower chamber of the firebox, the temperatures experienced by the material of the upper chamber are much higher than the temperatures experienced by the material out of which the lower chamber is constructed. And even within the upper chamber, the temperatures experienced and the rates of temperature change experienced by different portions of the bowl of the upper chamber vary widely.

The effect of all of these different expansions and contractions of the firebox, despite being minimized by the nature of the refractory materials, tend to take a toll over time, resulting in cracking of the firebox. Obviously, the firebox cracking is much preferable to cracks developing within the walls of the grill itself, but the need exists for an improved firebox which is less susceptible to cracking and failure.

Additionally, because fireboxes have the highest frequency of failure due to cracking, significant costs are incurred in replacing them, both on the consumer side and by manufacturers when the firebox remains under warranty. Because of the size and weight of existing fireboxes, simply shipping such large pieces incurs significant expense. In addition to a firebox that suffers a reduction in the frequency of breakage, there is a need to reduce the cost and expense of replacement fireboxes.

It is known to manufacture "advanced ceramics," also known as "fine ceramics," "technical ceramics" or "engineered ceramics" designed to have lower coefficients of thermal expansion. Similarly, composite ceramics with additives or elements have been used to try to improve the material's ability to withstand cracking due to heating and cooling. Such elements include mullite, spodumene and cordierite. Ceramics may also be fiber reinforced. These techniques may be employed in the manufacture of grills, but forming grills and grill components with such advanced or composite ceramics increases cost.

Thus there remains a need for an improved firebox design that will decrease the rate of firebox failure due to cracking of the walls of the firebox. Similarly, there remains a need for an improved firebox design that can reduce reliance on advanced or composite ceramics as the sole means for avoiding cracking and breakage and allows less expensive alternative refractories to be utilized while still achieving an improved performance against cracking. There also remains a need to reduce the cost of having to replace fireboxes that fail.

SUMMARY OF THE INVENTION

The improved firebox design of the present invention provides a multiple piece firebox comprising at least two pieces, a base and an upper chamber or bowl. In a preferred embodiment, the firebox comprises at least three and preferably a plurality of side wall members removeably supported within the cooking chamber of a grill by a base. By providing a firebox in separate multiple pieces that simply releasably fit together to form a structure sufficiently rigid for the purposes of containing and aiding in the proper formation of the combustible fuel, the rate of firebox failure due to cracking may be significantly reduced. Cracking is reduced because smaller components achieve a substantially more homogeneous temperature and undergo less distortion and stress based on thermal expansion and contraction compared to larger components. The mated smaller components provide a firebox assembly which can more safely absorb the heat-induced expansion and contraction of the refractory material.

A feature of the present invention is to provide a firebox for a fuel-burning cooking vessel, said cooking vessel having a kettle formed by a floor and one or more upwardly-extending walls about the floor, wherein the firebox comprises a base on the floor defining a lower chamber of the firebox, one or more side wall members supported by the base alone, or supported between the base and the upwardly-extending walls of the kettle, said plurality of side wall members defining an upper chamber of the firebox.

Rather than being formed as a monolithic, one piece structure, a preferred firebox of the present invention comprises a base and one or more, and preferably at least three or more side wall members, each formed to rest atop the base and mate with the vertical edges of the adjacent side wall members, interconnecting to define a substantially solid, open-bottomed bowl or upper chamber of the firebox within which the fuel may be contained. The firebox of the present invention further comprises an independent base defining a lower chamber of the firebox below the upper chamber. For kamado grills having a circular cross section in the horizontal plane (i.e., the plane perpendicular to the vertical axis of the grill), the upper chamber or bowl formed by the plurality of side wall members is also circular in cross section, and thus in embodiments having two or more side wall members, each side wall member can have an identical size and shape, each representing an equal sector or section of the bowl. An upper chamber having a circular cross section may generally be roughly hemispherical in shape (with an open bottom), though likely not perfectly so, depending on the desired curvature of the bowl. The upper chamber need not be curved in the shape of a bowl, it could have relatively flat sides and bottom, though a bowl-like shape is preferred as is conforming the curvature of the bowl to the interior of the cooking chamber. For kettles having an irregular cross section, the side wall members may not be identical in size or shape so that the upper chamber is shaped to correspond to the shape of the grill. In such an irregularly-shaped grill, the base would also be irregularly shaped to correspond to the shape of the grill and the side wall members which the base supports.

While in one embodiment, the plurality of side wall members of the present invention may be affixed or secured together and, alternatively, also to the base, in one preferred embodiment, the firebox is formed by merely resting or leaning the components upon each other and the lower kettle of the grill. The vertical edges of the identically-shaped side wall members are formed with male and female bevels or projections which engage or interlock with corresponding male or female bevels or projections on the corresponding opposite vertical edge of the succeeding side wall member.

Similarly, the lower portion or edge of each side wall member is shaped to interact with and be supported upon the upper portion of the base. Such interaction may be of such rigidity as to support and hold the side wall member upright without any other support, such as by a tongue and groove type connection, but for simplicity and to avoid breakage, the preferred interaction is less rigid, relying simply on a less severely shaped interconnection that, when combined with additional support provided for the side wall members as they lean against the inner surface of the upwardly-extending walls of the lower kettle, are sufficient to maintain the side wall members in their upright position. The force of gravity simply keeps the side wall members in place atop the base. The side wall members are sized to interconnect together when assembled or leaning outwardly to rest against the walls of the kettle. The lateral forces between each side wall member and the adjacent side wall members also serve to retain the assembled bow in place, much like a house of cards with each side wall member leaning against and supported by its neighbor, and all collectively supporting each other in position to form the upper chamber of the firebox. Thus, the user may simply build the multi-piece firebox by placing the pieces within the kettle in the proper order: base first on the bottom, followed by the plurality of side wall members, and, if desired, a retaining member about the top of the firebox. Similarly, the pieces of the firebox may simply be manually lifted out of the kettle without having to release any clasps or other contacts that require manual manipulation.

In another alternative aspect of the present invention, the side wall members further comprise spacers, such as one or more bumps or protrusions on the outwardly-facing surface of the side wall members. The spacers contact the inner walls of the kettle and prevent the outwardly-facing surface of the side wall members from resting substantially flat against the inner walls of the kettle along their entire width and thereby create a seal about the perimeter of the kettle which could prevent or substantially inhibit the flow of air within the kettle about the firebox. Instead, the spacers act to create a gap between the outwardly-facing surface of the side wall members and the inner walls of the kettle, thereby allowing air to freely circulate within the cooking chamber of the grill about the firebox. Spacers may comprise a simple bump, tab or other protrusion.

In another alternative aspect of the present invention, additional structural support for the firebox may be provided by a lower grate resting atop the base. The upper portion of the base may be configured to support both a grate across the top of the base and the side of the grate may also be positioned to provide additional support against the inward force vectors generated by leaning the top of the side wall members outward against the kettle walls.

In yet another alternative aspect of the present invention, the firebox of the present invention may further comprise an inverted, U-shaped top cap or retaining member which may be fitted about the top portions of the side wall members to provide additional stability to the firebox. Where a top cap is utilized, the plurality of side wall members need not lean against the kettle walls to maintain their position as the cap will prevent the side wall members from spreading apart. Accordingly, in such an embodiment, the side wall members need not have spacers. The top cap may also provide guides or tabs or other positioning elements to hold or assist with the proper location of the cooking surface or a rack to support the cooking surface. Alternatively, a cooking surface could itself be fashioned by one skilled in the art to function as the retaining member, such as being provided with hooks, tabs or clamps to fit across or around the top portion of the assembled side wall members and retain them in place.

Finally, in yet another alternative aspect of the present invention, the firebox of the present invention may comprise only a base and a bowl that rests atop the base, though this monolithic bowl is less preferred as it may be more susceptible to cracking due to its size.

BRIEF DESCRIPTION OF THE DRAWINGS

The particular features and advantages of the invention as well as other objects will become apparent from the following description taken in connection with the accompanying drawings in which.

DETAILED DESCRIPTION OF THE PRESENT INVENTION

Figure 1:
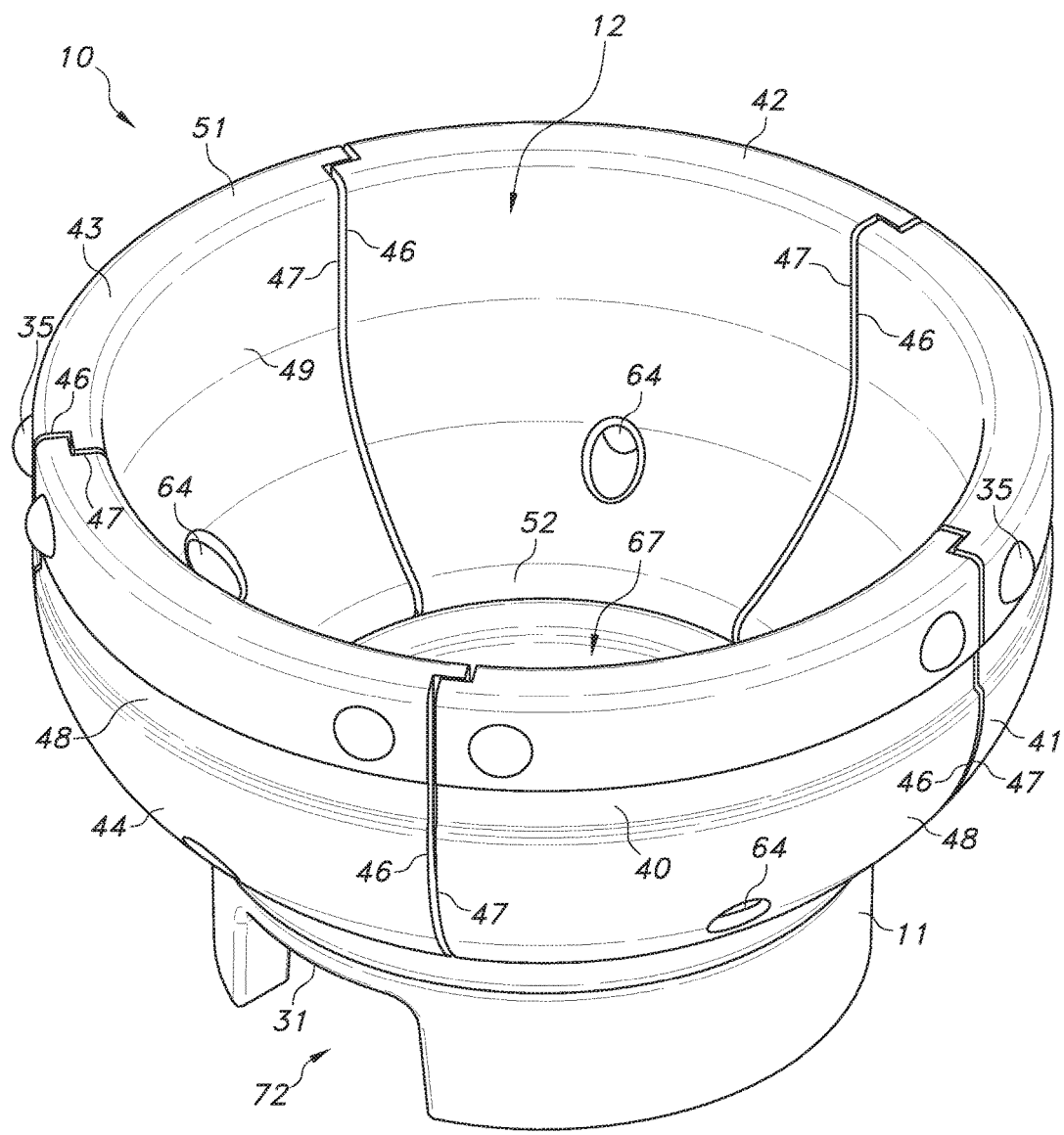
FIG. 1 is a perspective view of a multiple piece firebox according to the present invention.

FIG. 1 shows a perspective view of one preferred embodiment of a multiple piece firebox 10 of the present invention. The firebox 10 and its components, unless otherwise noted, are formed of refractory materials. The firebox 10 comprises a base 11 which supports a side wall member, and preferably at least two or more side wall members 40, 41, 42, 43, 44, defining and substantially enclosing an upper chamber 12 or bowl of the firebox 10. The base 11 defines a generally open-topped lower chamber 72 of the firebox 10. Base 11 preferably has one or more ash openings 31 to allow the ash from spent fuel (not shown) which falls into and accumulates within the lower chamber 72 to be removed from the firebox 10.

The side wall members 40, 41, 42, 43, 44 assemble to define a generally open-bottomed upper chamber 12. When the upper chamber 12 is supported by the base 11, an opening 67 is defined between the upper chamber 12 and lower chamber 72 allowing matter or fluid to communicate or pass between the upper chamber 12 and lower chamber 72.

Each side wall member 40, 41, 42, 43, 44 has opposing right edges 46 and left edges 47. The side wall members 40, 41, 42, 43, 44 rest one adjacent to the next about the upper portion of the base 11 until the last side wall member 40, 41, 42, 43, 44 rests adjacent to the first side wall member 40, 41, 42, 43, 44, the side wall members 40, 41, 42, 43, 44 thereby defining the generally impervious upper chamber 12. The edges 46 and 47 of the side wall members 40, 41, 42, 43, 44 are positioned adjacent to each other, though do not necessarily have to touch, they just need to be sufficiently close to the adjacent edge to effectively prevent the majority of the burning fuel (not shown) from escaping the upper chamber 12. In other words, the plurality of side wall members 40, 41, 42, 43, 44 supported upon the base 11 rest sequentially or one following the next, edge to edge to the next side wall member 40, 41, 42, 43, 44 about the base 11.

Preferably, the right edge 46 of a first side wall member 40 is formed to mate with the corresponding left edge 47 of an adjacent second side wall member 41, such as with the illustrated half lap joint, though other types of common joints are within the contemplation of the present invention, such as tongue and groove joints, dovetail joints and rabbet joints. The right edge 46 of the second side wall member 41 in turn mates with the left edge 47 of an adjacent third side wall member 42, and so on, with each following adjacent side wall member mating at the edges 46 and 47 with the next adjacent side wall member, until the right edge 46 of the last of the plurality of side wall members (shown as 44 in FIG. 1) mates with the left edge 47 of the first side wall member 40. The interconnected side wall members 40, 41, 42, 43 and 44 define a substantially solid bowl or upper chamber 12 of the firebox 10, said upper chamber 12 defining an opening near the bottom portion 52 of the side wall members 40, 41, 42, 43, 44. Side wall members 40, 41, 42, 43, 44 may optionally define one or more holes 64 or small openings between the inner surface 49 to the outer surface 48 which allow improved air flow about the firebox 10 within the kettle 15. Such holes 64 are preferably relatively small openings to allow the passage of air, but not allow significant amounts of fuel or other materials to pass through.

Figure 2:
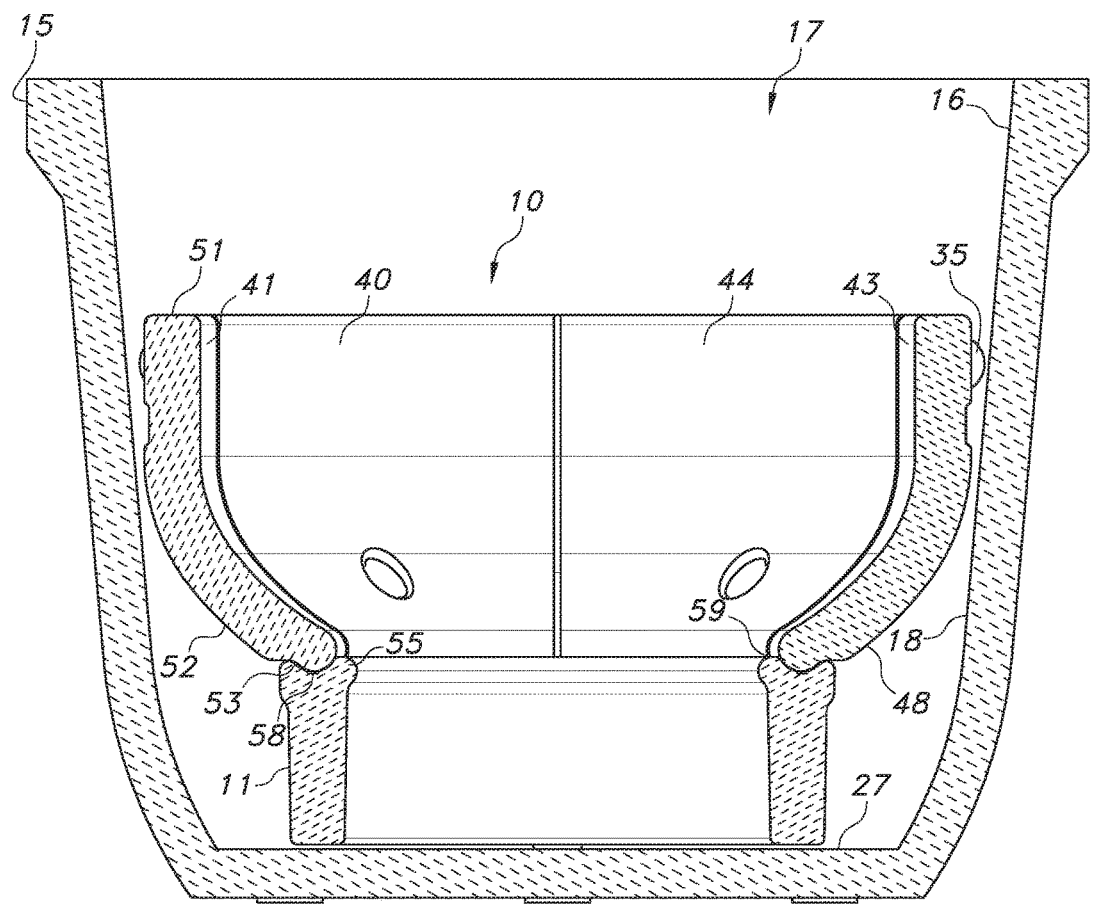
FIG. 2 is a cross sectional view of a multiple piece firebox according to the present invention within the lower kettle of a grill.

As best shown in FIG. 2, each side wall member 40, 41, 42, 43, 44 has a top-portion or edge 51 and a bottom portion or edge 52 as well as an outwardly-facing portion or surface 48 and an inwardly-facing portion or surface 49. The top portions 51 of the side wall members 40, 41, 42, 43, 44 provide a level surface about the top portions 51 of the bowl 12 upon which a grilling surface (not shown) or fire ring (not shown) or retaining member (shown in FIG. 4) may rest or engage. In a preferred embodiment, the top portions 51 of the side wall members 40, 41, 42, 43, 44 provide a substantially uniform, preferably substantially planar and more preferably relatively level and planar surface, though the surface may alternatively include positioning slots or indentions (not shown) to aid in the placement and retention of a grilling surface (not shown), rack (not shown), fire ring (not shown) or retaining member (shown in FIG. 4). The bottom portion 52 of a side wall member 40, 41, 42, 43, 44 is shaped to cooperate with and be supported upon the upper portion 55 of the base 11. In one preferred embodiment, side wall members 40, 41, 42, 43, 44 are further supported in an upright position atop the base 11 by leaning outwardly against the upwardly-extending walls 16 of the kettle 15. Alternatively, as better illustrated in FIG. 4, side wall members 40, 41, 42, 43, 44 need not necessarily rest against the kettle 15 and may be held in position through engagement with the base 11 and use of a retaining member 60 about the top portions 51 of the side wall members 40, 41, 42, 43, 44.

Again, while any type of common joint can be used between the base 11 and side wall members 40, 41, 42, 43, 44, in the preferred embodiment illustrated in FIG. 2, the upper portion 55 of the base 11 comprises an indentation 58 which is sized to receive and frictionally support a cooperating curve or projection 53 of the bottom portion 52 of a side wall member 40, 41, 42, 43, 44.

Figure 3:
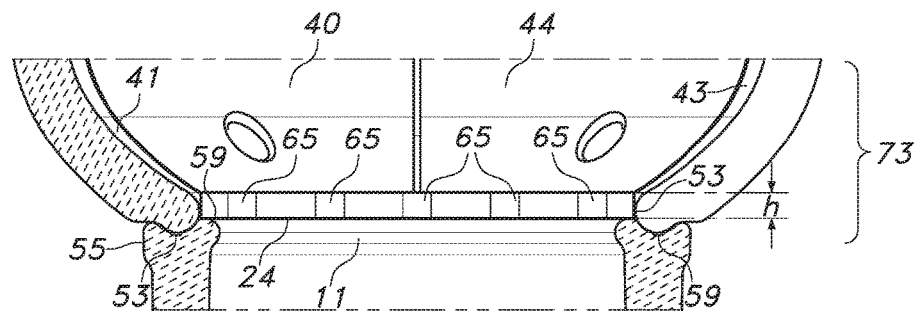
FIG. 3 is a partial cross sectional view of the upper portion of the firebox base supporting the bottom portion of the side wall members, and the lower grate.

FIG. 3 is a partial cross sectional view of a portion of a preferred embodiment of the firebox 10 in which the upper portion 55 of the firebox base 11 is configured to support both the bottom portion 52 of the side wall members 40, 41, 42, 43, 44, and a lower grate 24 spanning the firebox 10 proximate to the transition portion 73 between the upper chamber 12 of the firebox 10 and the lower chamber 72 of the firebox 10. Lower grate 24 may be metal or any other suitable refractory material rigid enough to support the fuel (not shown) within the upper chamber 12 of the firebox 10. Lower grate 24 has a plurality of perforations 65 to allow ash (not shown) from the burnt fuel to fall through it into the lower chamber 72 of the firebox 10. Lower grate 24 supports the fuel above the floor 27 of the kettle (shown in FIG. 2) and allows for the free flow of air to the fuel. As shown in FIG. 3, the upper portion 55 of the base 11 further comprises a lip 59 sized to receive and support lower grate 24 about its periphery or outer edges 26. The bottom portion 52 of side wall members 40, 41, 42, 43, 44 may additionally have a height h extending above the level of the lip 59, such as a portion of curve 53, so that the lower grate 24 may act as a buttress to support the side wall members 40, 41, 42, 43, 44.

In a less preferred embodiment not illustrated in the figures, the cooperative interaction or joint between the upper portion 55 of the base 11 and the bottom portion 52 of the side wall members 40, 41, 42, 43, 44 may be fashioned to such close tolerances as to rigidly support and hold a side wall member 40, 41, 42, 43, 44 upright without any other support, such as by a tongue and groove or tab and slot type connection. However, such rigid connections may be more prone to breakage and are more difficult to assemble and disassemble. This can be important because after it is put into use, the inside of a firebox 10 is a dirty environment, making users reluctant to soil their hands to engage and disengage tight connections between parts.

Similarly, in another embodiment that is not shown in the figures, the side wall members may include a means for releasably affixing or securing them to each other or the base or both. Such means could include cooperating catches and slots, or pegs and holes, or other connectors that can be formed or cast into the refractory materials of the side wall members.

Accordingly, it is preferred that the interconnections between the upper portion 55 of the base 11 and lower portions 52 of the side wall members 40, 41, 42, 43, 44, as well as the left and right side mating edges 46, 47, be fairly simple and easy to assemble, essentially being capable of merely being placed into position using only the force of gravity to maintain the assembly of the firebox 10. For example, as shown in FIG. 1, the vertical edges 46, 47 of the identically-shaped side wall members 40, 41, 42, 43, 44 show a half lap joint formed with male and female bevels or projections which engage with corresponding male or female bevels or projections on the opposite vertical edge 46, 47 of the succeeding side wall member 40, 41, 42, 43, 44. Thus, referring to FIG. 2, the firebox 10 may be assembled by first placing the base 11 upon the kettle floor 27 of the grill base 15. Though not shown in FIG. 2, the ash opening 31 of the base 11 is preferably aligned with an ash opening (not shown) in the kettle base 15. Once the base 11 is placed within the cooking chamber 17 of the kettle base 15, the bottom portion 52 of the side wall members 40, 41, 42, 43, 44 are placed into the receiving upper portion 55 of the base 11 and leaned back to rest against the upwardly-extending walls 16 of the kettle 15. Side wall members 40, 41, 42, 43, 44 are pushed against each other to form the upper chamber 12 of the firebox 10. The lower grate 24 is then rested atop the upper portion 55 of the base 11 as shown in FIG. 3.

Returning then to FIG. 2, side wall members 40, 41, 42, 43, 44 may further comprise one or more spacers, such as bumps 35. As shown in FIG. 2, spacers 35 provide raised points of contact between the outwardly-facing portion 48 of a side wall member 44 against the upwardly-extending inner walls 16 of the kettle 15. Spacers 35 provide a gap between the outwardly-facing portion 48 of a side wall member 44 and the inner surface of the upwardly-extending walls 16 of the kettle 15 so that air may more freely circulate about the firebox 10. Spacers 35 may take almost any conceivable suitable size or shape, the only purpose being to serve as a means to set the outer surface 48 of the side wall member 44 apart from the kettle walls 16 for the purpose of promoting air flow within the kettle 15 about the firebox 10. In another embodiment not shown in the figures, spacers could alternately be provided on the inner walls 16 of the kettle 15 to serve the same purpose. Such spacers 35 on the inner walls 16 of the kettle 15 would be positioned to receive the outwardly-facing portion 48 of the side wall members 40, 41, 42, 43, 44.

In the embodiment shown in FIG. 1, the side wall members 40, 41, 42, 43, 44 define a circular upper chamber 12 of the firebox 10. Such an embodiment would be used in a kettle 15 having a circular cross section in the horizontal plane (not shown in FIG. 1). In such a circular embodiment, the upper chamber 12 formed by the plurality of side wall members 40, 41, 42, 43, 44 is also circular in cross section, and thus each side wall member 40, 41, 42, 43, 44 may be identical in size and shape, each representing an equal sector or section of the upper chamber 12. Configuring the firebox 10 to be assembled from identically-shaped side wall members 40, 41, 42, 43, 44 provides an advantage in manufacturing and helps keep construction costs low because only two shapes of pieces would need to be molded and cast: a plurality of identical side wall members 40, 41, 42, 43, 44 and a base 11. The number of identical side wall members 40, 41, 42, 43, 44 may be determined by dividing 360° by the number of desired side wall members 40, 41, 42, 43, 44. To provide adequate advantages in relieving the stresses of temperature changes, in the most preferred embodiment, the plurality of identical side wall members 40, 41, 42, 43, 44 should comprise at least three identical side wall members (not an embodiment shown). While embodiments having up to 10 identical side wall members are within the contemplation of the present invention, the accompanying figures show a preferred embodiment having five identical side wall members 40, 41, 42, 43, 44. Having the preferred range of 4 to 6 identical side wall members has been found to provide an improved amount of resistance to cracking without needlessly increasing the number of side wall members. The more side wall members there are, the smaller each side wall member would be. Smaller side wall members results in a less stable assembled firebox 10 and greater likelihood of one or more side wall members becoming displaced by shifting in the burning fuel during ordinary usage.

For grill kettles having an irregular or non-circular cross section (not shown), the side wall members need not be identical in size or shape so that the upper chamber can be formed to have a shape corresponding to the shape of the grill. In such an irregularly-shaped grill, the base would also be irregularly shaped to correspond to the shape of the grill kettle and the side wall members which the base supports.

Figure 4:
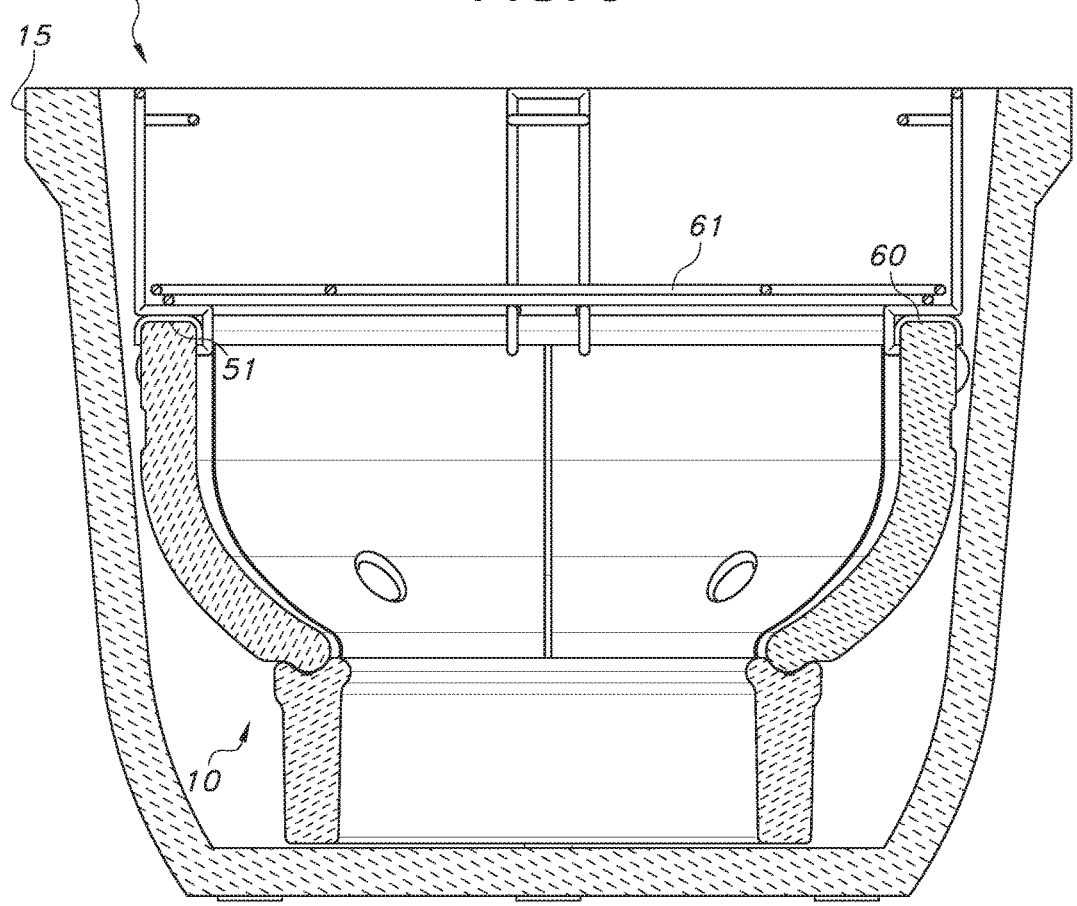
FIG. 4 is a cross sectional view of an embodiment of the multiple piece firebox of the present invention having a retaining member and a rack holder shown within the lower kettle of the cooking chamber of a grill.

FIG. 4 is a cross sectional view of an embodiment of a multiple piece firebox 10 according to the present invention having a metal retaining member or cap 60 and a rack holder 61 shown within the lower kettle 15 of a cooking vessel 20. The top portions 51 of the side wall members 40, 41, 42, 43, 44 provide a substantially uniform, preferably substantially planar and more preferably level and planar surface. Cap 60 is fitted onto the top portions 51 of all side wall members 40, 41, 42, 43, 44 to retain the side wall members 40, 41, 42, 43, 44 in position once assembled. In a preferred embodiment, cap 60 is made of a suitable metal. Cap 60 is also adapted to releasably engage a metallic rack holder 61 upon which a cooking surface or cooking grate (not shown) spanning the upper chamber 12 of the firebox 10 may be supported and releasably attached. The rack holder 61 may further comprise a plurality of positioning elements 62, such as holes, grooves, pins or guides, to aid in properly positioning the cooking surface (not shown). Alternatively, the cooking surface (not shown) may be supported directly upon to top portions 51 of the side wall members 40, 41, 42, 43, 44. In alternate embodiments not shown in the figures, an intermediate fire ring (not shown) of refractory material may be positioned directly atop the top portions 51 of the side wall members 40, 41, 42, 43, 44 or cap 60, and then the rack holder or cooking surface supported by the fire ring.

Figure 5:
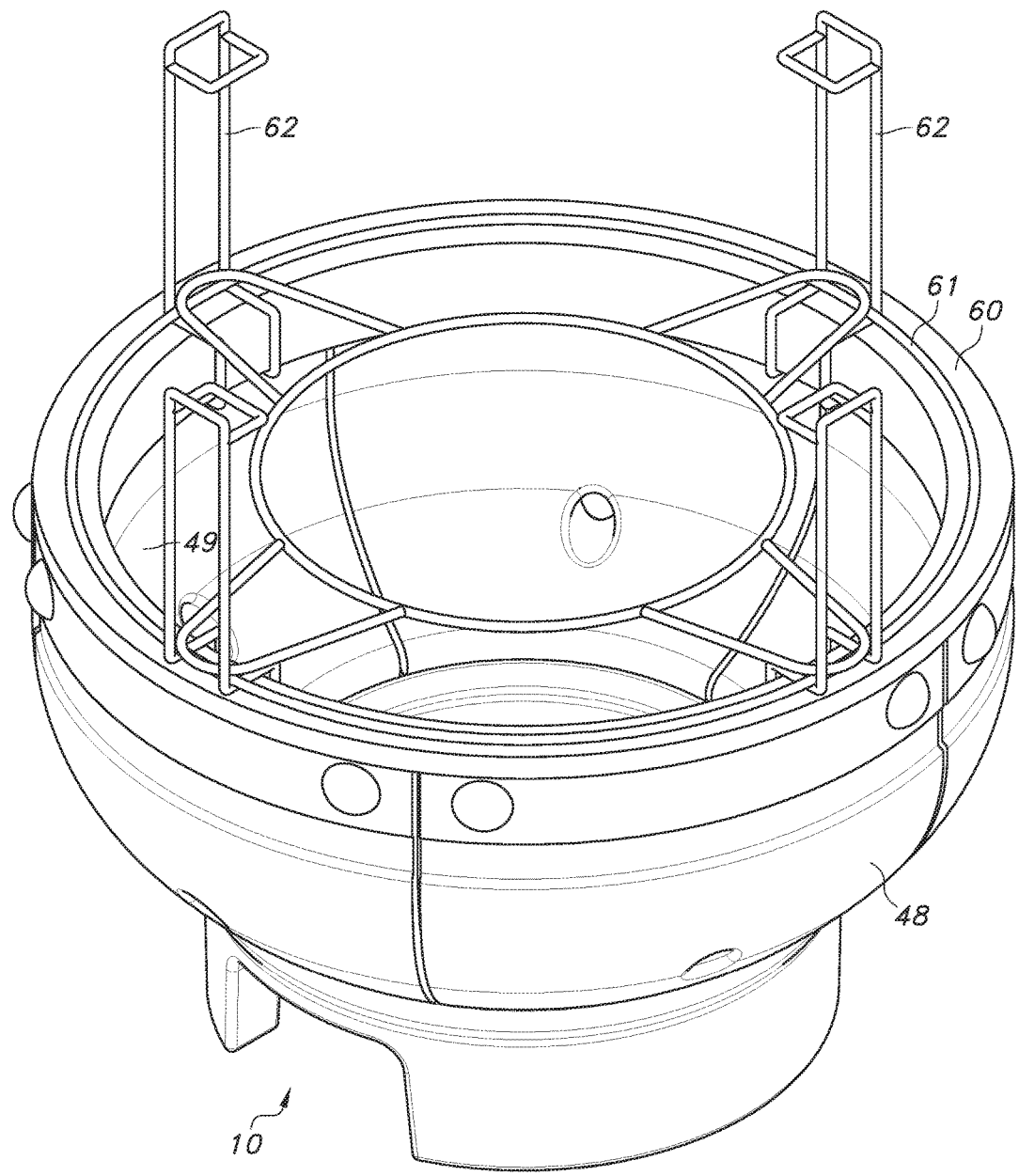
FIG. 5 is a perspective view of the multiple piece firebox of FIG. 4.

FIG. 5 is a perspective view of the circular multiple piece firebox 10 of FIG. 4 having a cap 60 and a rack holder 61. As can be seen, the cap 60 is circular to cover or be seated about all of the top portions 51 of the side wall members 40, 41, 42, 43, 44. The cap 60 is preferably U-shaped in cross section so that it covers the top surfaces and the top edges of both the inside surface 49 and outside surface 48 of the side wall members 40, 41, 42, 43, 44, thereby serving to retain the side wall members 40, 41, 42, 43, 44 within the cap 60 and prevent them from shifting relative to each other. By utilizing a cap 60, the side wall members 40, 41, 42, 43, 44 need not be sized to lean against and be supported against the upwardly-extending kettle walls 16. The combination of the cap 60 and the interconnection between the bottom portions 52 of the side wall members 40, 41, 42, 43, 44 and the upper portion 55 of the base 11 ensure that the upper chamber 12 of the firebox 10 will be retained in place and in the proper shape atop the base 11.

Figure 6:
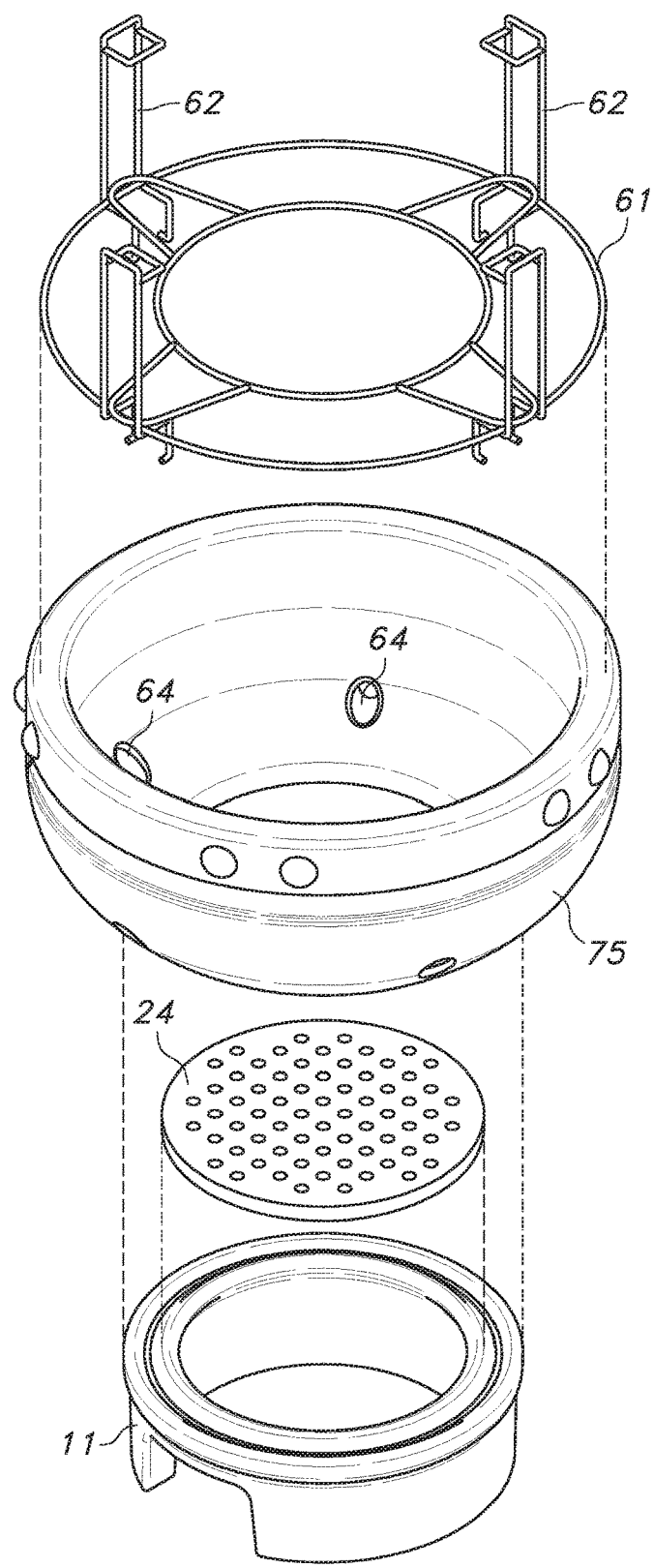
FIG. 6 is an exploded perspective view of an embodiment of the multiple piece firebox of the present invention.

FIG. 6 is an exploded perspective view of another embodiment of the multiple piece firebox 75 according to the present invention in which the firebox 75 comprises a base 11 and a detachable upper chamber or single-piece bowl 76 and a lower grate 24. Because it is a single piece, there would be no need for the upper chamber 76 to contact the upwardly-extending walls (not shown) of the kettle nor for a cap (not shown) to be placed on the top of the upper chamber 76 to assist in holding any side wall members (not shown) in place as the refractory material from which such an upper chamber 76 is formed will be sufficiently rigid to maintain it in an upright position on the base 11. Though such an embodiment of a firebox 75 is within the contemplation of the present invention, it is less preferred because while it does separate the base 11 from the upper chamber 76, thus eliminating the most significant temperature differential encountered in prior art fireboxes, the single-piece upper chamber 76 is so large that in use, it will likely continue to encounter significant temperature differentials in different areas of the upper chamber 76, a problem that is diminished by employing the preferred plurality of side wall members.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

I claim:

1. A firebox for a fuel-burning cooking vessel, the firebox comprising:
   (a) a base defining a lower chamber of the firebox; and
   (b) a bowl defining an upper chamber of the firebox, the bowl comprising two or more outwardly leaning side wall members removeably supported upon the base, the two or more outwardly leaning side wall members resting sequentially, edge to edge to the next side wall member about the base, wherein each of the side wall members comprise a joint configured to mate with a corresponding joint of another side wall member, wherein the inner face on one side of each side wall member overlaps with the outer face of an adjacent side wall member;
   (c) wherein the upper chamber is in fluid communication with the lower chamber; and
   (d) wherein when the firebox is inserted within the fuel-burning cooking vessel, each side wall member is separately removeable from the other side wall members.

2. The firebox of claim 1 wherein the side wall members are composed of a refractory material selected from the group consisting of ceramic, clay, terracotta and crushed lava rock.

3. The firebox of claim 1 wherein each of the side wall members are identically shaped.

4. The firebox of claim 1 wherein each of the plurality of side wall members further comprises a first vertical edge comprising a male connection and a second opposing vertical edge comprising a female connection.

5. The firebox of claim 1 wherein each of the side wall members further comprises a top portion, and the firebox further comprises a retaining member about the top portions of the side wall members.

6. The firebox of claim 1 further comprising a lower grate spanning the firebox proximate to a transition portion between the upper chamber and the lower chamber and wherein the lower grate further supports the side wall members.

7. A fuel-burning cooking vessel comprising a kettle formed by a floor and one or more upwardly-extending walls about the floor; and,
   a firebox disposed within the kettle, the firebox comprising:
   (a) a base on the floor, the base defining a lower chamber of the firebox; and
   (b) a plurality of side wall members extending up from and removeably supported upon the base, the plurality of side wall members defining an upper chamber of the firebox, wherein the inner face on one side of each side wall member overlaps with the outer face of an adjacent side wall member such that each of the side wall members is separately removeable from the other side wall members.

8. The fuel-burning cooking vessel of claim 7 wherein each of the side wall members are supported between the base and the upwardly-extending walls of the kettle.

9. The fuel-burning cooking vessel of claim 8 wherein the side wall members are further supported by the grate.

10. The fuel-burning cooking vessel of claim 7 further comprising:
    (a) a transition portion of the firebox between the lower chamber and the upper chamber; and
    (b) a grate spanning the firebox proximate to the transition portion of the fire box.

11. The fuel-burning cooking vessel of claim 7 further comprising a grate spanning the firebox, the grate engaging a bottom portion of the side wall members.

12. The fuel-burning cooking vessel of claim 7 further comprising a grate spanning the firebox, the grate supported by an upper portion of the base.

13. The fuel-burning cooking vessel of claim 7 further comprising:
    (a) a grate spanning the firebox;
    (b) wherein a lower portion of at least a first of the side wall members engages the grate; and
    (c) wherein an outwardly-facing portion of such first side wall member engages an inner surface of one of the upwardly-extending walls of the kettle.

14. The fuel-burning cooking vessel of claim 13 wherein the outwardly-facing portion further comprises a spacer.

15. The fuel-burning cooking vessel of claim 7 wherein:
    (a) a lower portion of at least a first of the side wall members engages an upper portion of the base; and
    (b) an outwardly-facing portion of the first side wall member engages an inner surface of the kettle.

16. The fuel-burning cooking vessel of claim 15 wherein the outwardly-facing portion further comprises one or more spacers.

17. The fuel-burning cooking vessel of claim 7 wherein the base is formed of a refractory material.

18. The fuel-burning cooking vessel of claim 17 wherein the refractory material is selected from the group consisting of ceramic, clay, terracotta and crushed lava rock.

19. The fuel-burning cooking vessel of claim 7 wherein the side wall members are formed of a refractory material.

20. The fuel-burning cooking vessel of claim 19 wherein the refractory material is selected from the group consisting of ceramic, clay, terracotta and crushed lava rock.

21. The fuel-burning cooking vessel of claim 7 wherein each of the side wall members further comprises a top portion, and the firebox further comprises a retaining member about the top portions of the side wall members.

22. The fuel-burning cooking vessel of claim 7 wherein each of the side wall members are identically shaped.

23. The fuel-burning cooking vessel of claim 7 wherein each of the plurality of side wall members further comprises a first vertical edge comprising a male connection and a second opposing vertical edge comprising a female connection.

24. A firebox for a fuel-burning cooking vessel, the firebox comprising:
    a base defining a lower chamber of the firebox; and
    a bowl defining an upper chamber of the firebox, the bowl comprising two or more side wall members removeably supported upon the base, the two or more side wall members resting sequentially, edge to edge to the next side wall member about the base, wherein each of the side wall members comprise a joint configured to mate with a corresponding joint of another side wall member such that each side wall member is separately removeable from the other side wall members and wherein the inner face on one side of each side wall member overlaps with the outer face of an adjacent side wall member.

* * * * *